United States Patent Office 2,763,961
Patented Sept. 25, 1956

2,763,961
METHOD OF SOIL CONDITIONING

Ernst Trommsdorff, Gerhard Abel, and Theodor Völker, Darmstadt, Germany, assignors to Rohm & Haas G. m. b. H., Darmstadt, Germany No Drawing. Application December 15, 1953,
Serial No. 398,437

Claims priority, application Germany December 22, 1952

3 Claims. (Cl. 47—58)

The present invention relates to a method for improving the physical structure of soil. More specifically, the invention relates to a method for improving the tilth of agricultural soil which comprises applying thereto a copolymer of certain characteristics.

In U. S. Patent No. 2,625,529 there is disclosed a large number of polyelectrolytes which are useful for improving the tilth of agricultural soils. It is generally understood that the action of such agents is based on their ability to promote the formation of crumbly soil aggregates. This loosening of the soil effects better aeration, easier drainage and less troublesome tilling, and as a result the growth of plants is facilitated and crops are increased.

Among the polyelectrolytes disclosed in the aforesaid patent there are included water-soluble salts of copolymers of acrylic or methacrylic acid with one or more additional polymerizable, monomeric compounds. For example, the patent discloses, specifically and generally, water-soluble salts of copolymers of acrylic acid and/or methacrylic acid with such monomers as acrylonitrile, dimethylaminoethyl methacrylate, styrene, and the lower alcohol esters of acrylic and methacrylic acids, e. g. methyl methacrylate. The present invention is concerned principally with the use of water-soluble salts of copolymers of this class as soil conditioning agents.

Although water-soluble salts of copolymers of the class described above are known to possess soil-agglomerating ability, there are many factors which influence this ability. The proportions of the ingredients comprising the copolymers is one of such factors and, while it has been recognized that changes in proportions of ingredients affect soil-agglomerating ability, it has not been possible to predict what effect a change in proportions will cause in the case of any given copolymer.

In formulating copolymers of acrylic or methacrylic acid for use as soil conditioning agents, it has been generally believed for instance that the copolymers would be more active the greater their content or carboxyl groups. Contrary to the general belief of the prior art, it has been found surprisingly in accordance with the present invention that the water-soluble salts of such copolymers possess optimum soil-improving properties when the proportions of the ingredients of the copolymer are so adjusted that the calcium salt of the copolymer has maximum solubility in water.

In accordance with our discovery we herein provide a method for improving the tilth of agricultural soils, which comprises applying to the soil a water-soluble salt of a copolymer of an acrylic acid, i. e., acrylic or methacrylic acid, with at least one other polymerizable, monomeric compound in a given proportion, the calcium salt of which copolymer in this given proportion has maximum solubility in water as compared to the calcium salts of the same copolymer in other proportions.

The invention is briefly illustrated by the following facts: The copolymer of acrylic acid and methyl methacrylate in equal proportions is water-soluble both in the form of the sodium salt and in the form of a mixed calcium-sodium salt, but the calcium salt of the copolymer is insoluble in water. The water-soluble salts of the copolymer in that proportion were found to possess a substantially poorer agglomerating action than a copolymer of the same ingredients in which the proportions were adjusted to 80% by weight acrylic acid and 20% by weight of methyl methacrylate. The copolymer in this latter proportion forms a calcium salt which is practically entirely soluble in water and thus the superiority of the copolymer of the latter proportion is explained by the present invention.

In a further embodiment of the present invention we have found that the molecular weight of the copolymer of acrylic acid or methacrylic acid is another especially important factor which greatly influences soil-conditioning ability and that, in order to obtain optimum soil-conditioning ability, the molecular weight of such copolymers should be greater than 300,000 and preferably between 500,000 and 1,000,000.

That such a high molecular weight was found to be optimum is quite surprising in view of the indications in the prior art that increasing the molecular weight of polymeric polyelectrolytes beyond 100,000 could not be expected to yield any advantageous results.

The present invention is applicable to the treatment of agricultural soil with a water-soluble salt of any copolymer of acrylic acid or methacrylic acid at least with one other polymerizable, unsaturated, monomeric compound such as those named hereinabove. A preferred class of polymerizable, unsaturated, monomeric compounds for copolymerization with the acrylic or methacrylic acid are the lower alcohol esters of acrylic and methacrylic acids such as methyl acrylate, ethyl acrylate, methyl methacrylate and ethyl methacrylate.

In order to illustrate the invention and its attendant advantages, the following examples are given in which parts and percentages are by weight unless otherwise specified.

EXAMPLE I

A series of five copolymers was prepared in conventional manner from methacrylic acid and methyl methacrylate using varying proportions of each monomer according to the following tabulation:

| Copolymer No. | Percent Methacrylic Acid | Percent Methyl Methacrylate |
|---|---|---|
| 1 | 50 | 50 |
| 2 | 60 | 40 |
| 3 | 65 | 35 |
| 4 | 70 | 30 |
| 5 | 80 | 20 |

Each copolymer had a molecular weight of approximately 300,000. From the copolymers obtained, sodium salts were prepared by neutralizing each copolymer with an amount of sodium hydroxide corresponding to the amount of carboxyl groups present in the copolymer. Sufficient sodium salt of each copolymer was then dissolved in water to provide a series of 0.5% aqueous solutions. To 10 ml. portions of each of the solutions thus prepared there was added 5 ml. of a 0.5% aqueous calcium chloride solution in order to convert the sodium salts of the copolymers into the corresponding calcium salts. The solutions were then observed for the formation of a precipitate or other evidence of insolubility of the calcium salt. The results were as follows:

Copolymer No.: Remarks
1 _____ precipitate.
2 _____ slight cloud.
3 _____ clear.
4 _____ precipitate.
5 _____ precipitate.

From the preceding description of the invention, the water-soluble salts of copolymer No. 3 should possess the greatest soil-agglomerating power inasmuch as the calcium salt of this copolymer has the maximum solubility in water compared to the other copolymers of the series. That such is the fact was proved by the following tests:

Test A

Four 500 grams portions of a soil (particle size up to 0.4 mm.) consisting of 50 parts garden earth, 30 parts clay and 20 parts sand were each wetted with 160 grams of the aqueous solutions of the sodium salts of copolymers 2 through 5 and, after uniform drying, were brought to a particle size of 0.4 to 4 mm. The samples of soil were then subjected to the Yoder test (Soil Science, vol. 6, June 1952). In this test the residue remaining between the screens in connection with a weighed sample of 50 grams and dried to constant weight at 100° C. constitutes a measure of the intensity of the soil agglomeration. The screen residues found were as follows:

| Copolymer No.: | Residue (grams) |
|---|---|
| 2 | 8.32 |
| 3 | 22.98 |
| 4 | 9.56 |
| 5 | 6.74 |
| Blank | 0.11 |

The results show that copolymer No. 3 which is the copolymer with the maximum calcium salt solubility also has the strongest agglomerating effect.

Test B

To individual 200 ml. portions of an aqueous clay suspension there was added 0.6 ml. of a 0.5% solution of the sodium salt of copolymers 1 through 5. Each portion of the clay suspension was then placed in a glass tube and allowed to stand. After 48 hours, the height of the sediment layer ($h_1$) and the height of the superimposed layer of water ($h_2$) were measured. In this test the quotient $h_1/h_2$ constitutes a measure of the agglomeration of the clay particles. The quotients obtained were as follows:

| Copolymer No.: | $h_1/h_2$ |
|---|---|
| 1 | 2.75 |
| 2 | 3.36 |
| 3 | 3.60 |
| 4 | 2.58 |
| 5 | 2.52 |
| Blank | 2.32 |

The superiority of copolymer No. 3 is again apparent.

EXAMPLE II

There was prepared a series of copolymers of 65 parts methacrylic acid and 35 parts methyl methacrylate of varying molecular weights.

Six individual 500 gram samples of a garden soil (particle size up to 0.4 mm.) comprising 60 parts garden earth, 20 parts clay and 20 parts sand were each thoroughly moistened with 160 grams of aqueous solutions of the sodium salts of the copolymers, each solution containing 500 mg. of a sodium salt. The moistened soil samples were then dried and reduced to a particle size of 0.4 to 4 mm. The specimens were then tested in accordance with the Yoder test. The residues remaining between the screens in the case of a weighed quantity of 50 grams of each sample were as follows:

| Molecular weight of copolymer: | Residue (grams) |
|---|---|
| 20,000 to 40,000 | 0.726 |
| 40,000 to 60,000 | 5.21 |
| About 100,000 | 6.06 |
| About 500,000 to 600,000 | 34.414 |
| 1,200,000 to 1,500,000 | 36.633 |
| 1,800,000 to 2,000,000 | 33.737 |
| Blank | 0.052 |

The results of this test show clearly that the soil-agglomerating ability of a polymer having a molecular weight of about 100,000 is only about 18% of the ability possessed by products having a molecular weight five to six times greater. The data also show that increasing the molecular weight of the copolymer above 1,000,000 does not effect an appreciable increase in the agglomerating ability of the copolymer. Accordingly, we prefer molecular weights in excess of 300,000, preferably from about 500,000 to 1,000,000.

The copolymers whose calcium salts possess maximum solubility in water according to the teachings of this invention can be used to treat soils in the form of any water-soluble salt, such as the ammonium, the alkali metal and mixed alkali metal-alkaline earth metal salts as well as the alkaline earth metal salts themselves. In some cases, it is desirable that the salt contain some free carboxyl groups. In treating soil, we prefer to incorporate in the soil from about 0.001 to about 2.0% by weight of the water-soluble salt of the copolymer.

The term "an acrylic acid" as used herein and in the appended claims includes acrylic acid and its higher homologues such as methacrylic acid.

It is intended to cover all changes and modifications in the examples of the invention, herein given for purposes of disclosure, which do not constitute departure from the spirit and scope of the appended claims.

We claim:

1. A method for improving the tilth of agricultural soil, which comprises applying to the soil a water-soluble salt of a copolymer having a molecular weight in excess of 300,000 of an acrylic acid and a polymerizable, unsaturated, monomeric compound in a given proportion, said proportion being such that the calcium salt of said copolymer has maximum solubility in water as compared to the calcium salt of said copolymer in other proportions.

2. A method according to claim 1 in which the polymerizable, unsaturated, monomeric compound is a lower alcohol ester of an acrylic acid.

3. A method according to claim 2 in which the polymerizable, unsaturated, monomeric compound is methyl methacrylate.

References Cited in the file of this patent

UNITED STATES PATENTS

| 2,550,371 | Naps et al. | Apr. 24, 1951 |
| 2,625,529 | Hedrick et al. | Jan. 13, 1953 |